United States Patent
Tzivanopoulos et al.

(10) Patent No.: US 11,488,795 B2
(45) Date of Patent: Nov. 1, 2022

(54) SWITCHING ELEMENT, SWITCHING DEVICE AND METHOD FOR THE OPERATION OF THE SWITCHING DEVICE

(71) Applicant: Robert Bosch GmbH, Stuttgart (DE)

(72) Inventors: Chrysanthos Tzivanopoulos, Remseck am Neckar (DE); Keonyeol Hwang, Gerlingen (DE)

(73) Assignee: Robert Bosch GmbH, Stuttgart (DE)

(*) Notice: Subject to any disclaimer, the term of this patent is extended or adjusted under 35 U.S.C. 154(b) by 246 days.

(21) Appl. No.: 16/921,123

(22) Filed: Jul. 6, 2020

(65) Prior Publication Data
US 2021/0005411 A1     Jan. 7, 2021

(30) Foreign Application Priority Data

Jul. 4, 2019   (DE) .......................... 102019209811.8

(51) Int. Cl.
| H01H 33/00 | (2006.01) |
| H01H 33/38 | (2006.01) |
| H01F 7/06  | (2006.01) |
| H01H 3/28  | (2006.01) |
| H01H 33/59 | (2006.01) |

(52) U.S. Cl.
CPC .............. *H01H 33/38* (2013.01); *H01F 7/064* (2013.01); *H01H 3/28* (2013.01); *H01H 33/59* (2013.01)

(58) Field of Classification Search
CPC .......... H01H 33/38; H01H 3/28; H01H 33/59; H01F 7/064
See application file for complete search history.

(56) References Cited

U.S. PATENT DOCUMENTS

| 2004/0012902 A1* | 1/2004 | Ikeda ................... F02N 11/087 361/23 |
| 2004/0201552 A1* | 10/2004 | Onozawa ............. G09G 3/2965 345/60 |
| 2014/0311434 A1* | 10/2014 | Hirabayashi .......... F02N 15/067 123/179.25 |
| 2015/0097375 A1 | 4/2015 | Qin et al. |
| 2015/0371748 A1 | 12/2015 | Kim |
| 2018/0261416 A1 | 9/2018 | Reuber et al. |

FOREIGN PATENT DOCUMENTS

| DE | 4110411 A1 | 1/1992 |
| DE | 60214666 T2 | 9/2007 |

* cited by examiner

*Primary Examiner* — Adolf D Berhane
*Assistant Examiner* — Afework S Demisse
(74) *Attorney, Agent, or Firm* — Michael Best & Friedrich LLP

(57) ABSTRACT

A switching element (100) that comprises a switching unit (30), a first and a second coil unit (10, 20) for closing and opening the switching unit (30), wherein the first coil unit (10) comprises a first coil (12) and wherein the second coil unit (20) comprises a second coil (22). According to the invention, the first coil unit (10) comprises a first controllable delay circuit (14) that is connected in series with the first coil (12). The invention further relates to a switching device (200) that comprises a switching element (100) according to the invention. The invention further relates to a first and a second method for the operation of the switching device (200) according to the invention.

14 Claims, 4 Drawing Sheets

SWITCHING ELEMENT, SWITCHING DEVICE AND METHOD FOR THE OPERATION OF THE SWITCHING DEVICE

BACKGROUND OF THE INVENTION

The invention relates to a switching element that comprises a switching unit, a first and a second coil unit for closing and opening the switching unit, wherein the first coil unit comprises a first coil and wherein the second coil unit comprises a second coil. The invention further relates to a switching device that comprises such a switching element. The invention further relates to a method for the operation of the switching device according to the invention. The invention also relates to a battery management system that comprises at least one switching device, and to a motor vehicle that comprises at least one battery management system.

It is becoming clear that in future, in particular in vehicles such as electric vehicles (EV), hybrid vehicles (HEV) or plug-in hybrid vehicles (PHEV), battery systems on which high demands in terms of reliability, power capacity, safety and service life will be placed, will increasingly be employed. A battery system primarily comprises a large number of battery cells and a battery management system for monitoring and control of the battery cells.

As a rule, a battery management system comprises a switching element or a switching device that serves to interrupt the flow of energy from or to the battery cells. In the event of a fault state in the switching element or in the switching device, the battery management system cannot exercise its primary function, namely the monitoring and control of the supply and storage of energy by the battery cells. This could lead to an unexpected situation such as an accident.

A switching device is known from the document US 2018/0261416 A1. The switching device comprises an electromagnetic actuator that comprises a first coil and a second coil for switching an electric circuit on and off.

The document US 2015/0371748 A1 discloses an electromagnetic actuating device for switching a vacuum valve on and off, wherein the electromagnetic actuating device comprises an electromagnetic actuating section. The electromagnetic actuating section comprises a first coil for switching the vacuum valve on and at least one second coil for switching the vacuum valve off.

SUMMARY OF THE INVENTION

A switching element is proposed. The switching element comprises a switching unit, a first and a second coil unit for closing and opening the switching unit, wherein the first coil unit comprises a first coil and wherein the second coil unit comprises a second coil.

According to the invention, the first coil unit comprises a first controllable delay circuit that is connected in series with the first coil.

The switching unit serves to switch an electric circuit on and off. It comprises various components such as, for example, an armature of ferromagnetic materials, at least one fixed switch contact and at least one movable switch contact. The armature here is mechanically bonded to the at least one movable switch contact. The armature moves in dependency on a magnetic field generated by a coil unit. The at least one fixed switch contact and the at least one movable switch contact can thus be connected together (corresponding to a closed state of the switching unit or to a switched-on state of the electric circuit) and disconnected (corresponding to an open state of the switching unit or a switched-off state of the electric circuit).

A delay circuit serves for automatically switching off a coil unit after a predefined period of time. A delay circuit is controllable if the predefined period of time, namely the delay time of the delay circuit, is adjustable. Advantageously the delay circuit is controllable by at least one control unit, so that the coil unit can automatically be switched off when required after an arbitrary period of time.

The second coil unit preferably comprises a second controllable delay circuit that is connected in series with the second coil.

A switching device that comprises a switching element according to the invention, at least one control unit for control of the first delay circuit and, if present, of the second delay circuit, a first driver circuit for driving the first coil unit of the switching element and a second driver circuit for driving the second coil unit of the switching element is further proposed.

In the event that the first and second coil unit each comprise a controllable delay circuit, the two delay circuits can be controlled by a common control unit. It is, however, also conceivable that the two delay circuits are assigned to one control unit each.

Driver circuit refers to an electric circuit that serves for switching the coil unit assigned to the driver circuit on and off. A driver circuit can, for example, be formed as an H-bridge circuit of four semiconductor switches such as, for example, MOSFETs or IGBTs. When closing the switching unit, through appropriate control of the four semiconductor switches a current flows in a first direction in the coil of the coil unit assigned to the driver circuit, while when opening the switching unit, a current flows in the coil in a second direction opposed to the first direction. The switching device can comprise a control device for control of the two driver circuits. It is, however, also conceivable that the two driver circuits are assigned to one control device each. It is also conceivable that the control of the driver circuits is performed by one or two external control devices.

The at least one control unit is preferably configured to control the first controllable delay circuit and the second controllable delay circuit separately from one another. This means that the delay time of the first and of the second delay circuits can be adjusted independently of one another by the at least one control unit.

The first and second coil units can be supplied via the respective driver circuits from a common energy source. It is also conceivable that the first control unit is supplied via the first driver circuit from a first energy source, while the second driver circuit is supplied from a second energy source.

According to a preferred embodiment of the invention, the switching device according to the invention comprises at least one internal energy source that supplies the first coil unit via the first driver circuit and the second coil unit via the second driver circuit. It is, however, also conceivable that the first and the second coil units are supplied by at least one external energy source. The at least one internal or external energy source can be constructed as an energy store such as, for example, a battery or capacitor.

A first method for operation of the switching device according to the invention is also proposed.

The switching unit of the switching element according to the invention is here closed through simultaneously switching on the first coil unit and the second coil unit. Regardless of whether the second control unit comprises a delay circuit, the switching unit remains closed after the closure. This means that after the closing of the switching unit, the first and/or the second coil unit are not switched off by the associated delay circuit.

The energy supply of the first and of the second coil unit is preferably continuously monitored. This can, for example, be achieved by a control device for control of the first and/or second driver circuits. Through the monitoring of the energy supply, a fault in the first and/or second coil unit or the respective driver circuits can be detected.

Whether the switching unit is truly switched on or off through operation of the first and/or second coil unit is preferably monitored.

In the presence of a fault state in the second coil unit or in the second driver circuit, the closed state of the switching unit will be maintained by the first coil unit. In the presence of a fault state in the first coil unit or in the first driver circuit, the closed state of the switching unit will be maintained by the second coil unit.

If a fault state is detected in the second coil unit or the second driver circuit, the first coil unit can be switched off by the first delay circuit after a predefined period of time if a control signal from the at least one control unit is supplied to the first delay circuit. The switching unit remains closed if a control signal is not supplied by the at least one control unit.

If a fault state is detected in the first coil unit or in the first driver circuit, and if the second coil unit comprises a second delay circuit, the second coil unit can be switched off by the second delay circuit after a predefined period of time if a control signal is supplied to the second delay circuit by the at least one control unit. The switching unit remains closed if a control signal is not supplied by the at least one control unit to the second delay circuit, or if the second coil unit does not comprise a delay circuit.

A second method for the operation of the switching device according to the invention is furthermore proposed.

The switching unit is closed here by switching on the second coil unit. Regardless of whether the second coil unit comprises a delay circuit, the switching unit remains closed after the closure. After detection of a fault state in the second coil unit or in the second driver circuit, the first coil unit is switched on.

Preferably the first coil unit is switched off in the second method according to the invention following a predefined period of time by the first delay circuit. This occurs if a control signal is supplied by the at least one control unit to the first delay circuit.

It is, of course, possible that the switching unit is closed by switching on the first coil unit, and that the second coil unit is switched on in the event of detecting a fault state in the first coil unit or in the first driver circuit.

In this case, the second coil unit can be is switched off by the second delay circuit after a predefined period of time if the second coil unit comprises a second delay circuit and a control signal is supplied by the at least one control unit to the second delay circuit. The switching unit remains closed if a control signal is not supplied by the at least one control unit to the second delay circuit, or if the second coil unit does not comprise a delay circuit.

A battery management system that comprises at least one switching device according to the invention is further proposed.

A motor vehicle that comprises at least one switching device according to the invention and/or at least one battery management system according to the invention is also proposed.

Advantages of the Invention

With the switching element according to the invention or the switching device according to the invention, the external electric circuit, such as for example an on-board network of a motor vehicle, can nevertheless remain switched on in the presence of a fault in one of the two coil units or of the associated driver circuit. The reliability and safety of the battery system and of the motor vehicle are thereby increased.

In addition to this, the external electric circuit can if required be switched off after a predefined period of time with the aid of the controllable delay circuits following the detection of a fault in the coil unit or its driver circuit. This creates the possibility that the external electric circuit can be switched off after a predefined period of time depending on the fault state.

A saving in the electrical energy for maintaining the closed state of the switching unit can be enabled by the method according to the invention, while the reliability and safety of the motor vehicle are ensured at the same time.

BRIEF DESCRIPTION OF THE DRAWINGS

Forms of embodiment of the invention are explained in more detail with reference to the drawings and the following description.

Here.

In the following description of the forms of embodiment of the invention, the same or similar elements are identified by the same reference sign, wherein a repeated description of these elements is omitted in individual cases. The figures only represent the object of the invention schematically.

DETAILED DESCRIPTION

Figure 1:
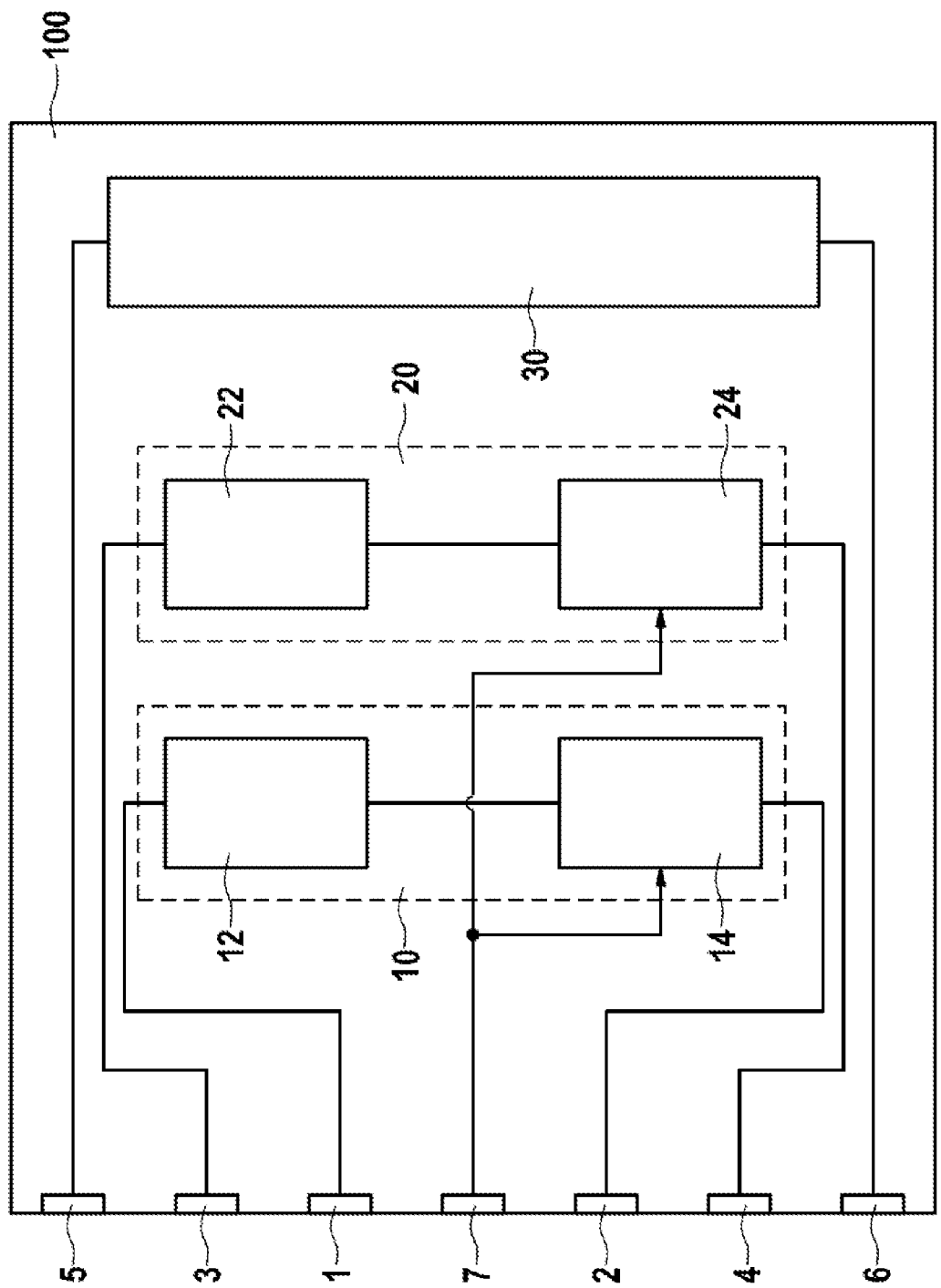
FIG. 1 shows a schematic illustration of a switching element according to the invention according to a first embodiment of the invention.

FIG. 1 shows a schematic illustration of a switching element 100 according to the invention according to a first embodiment of the invention. The switching element 100 according to the invention here comprises a first coil unit 10 and a second coil unit 20.

The first coil unit 10 here comprises a first coil 12 and a first controllable delay circuit 14, which are connected in series with one another. The second coil unit 20 here comprises a second coil 22 and a second controllable delay circuit 24 which are also connected in series with one another.

The switching element 100 according to the invention further comprises a switching unit 30 that comprises various components, such as for example an armature of ferromagnetic materials, at least one fixed switch contact and at least one movable switch contact. The armature here is mechanically bonded to the movable switch contact. The armature moves in dependency on a magnetic field generated by one or both coil units 10, 20. The at least one fixed switch contact and the at least one movable switch contact can thus be connected together or disconnected.

The switching element 100 according to the invention further comprises seven terminals 1 to 7. The first coil unit 10 is here connected electrically via a first terminal 1 and a second terminal 2 to a first driver circuit 50 (see FIGS. 3 and 4). The second coil unit 20 is connected electrically via a third terminal 3 and a fourth terminal 4 to a second driver circuit 60 (see FIGS. 3 and 4). An external electric circuit 300 (see FIG. 3) is connected electrically via a fifth terminal 5 and a sixth terminal 6 to the switch contacts of the switching unit 30. The switching element 100 can comprise yet more terminals, such as for example a ground terminal and terminals for further external electric circuits that are to be switched on and off by the switching unit 30.

Control signals are supplied via a seventh terminal 7 from a control unit 40 (see FIG. 3) to the first delay circuit 14 and the second delay circuit 24, so that the delay times of the first and of the second delay circuit 14, 24 can be arbitrarily adjusted as required. The control unit 40 can here generate a unique control signal for each controllable delay circuit 14, 24, or it can generate identical control signals for both controllable delay circuits 14, 24. This means that the two controllable delay circuits 14, 24 can have different or identical delay times.

Figure 2:
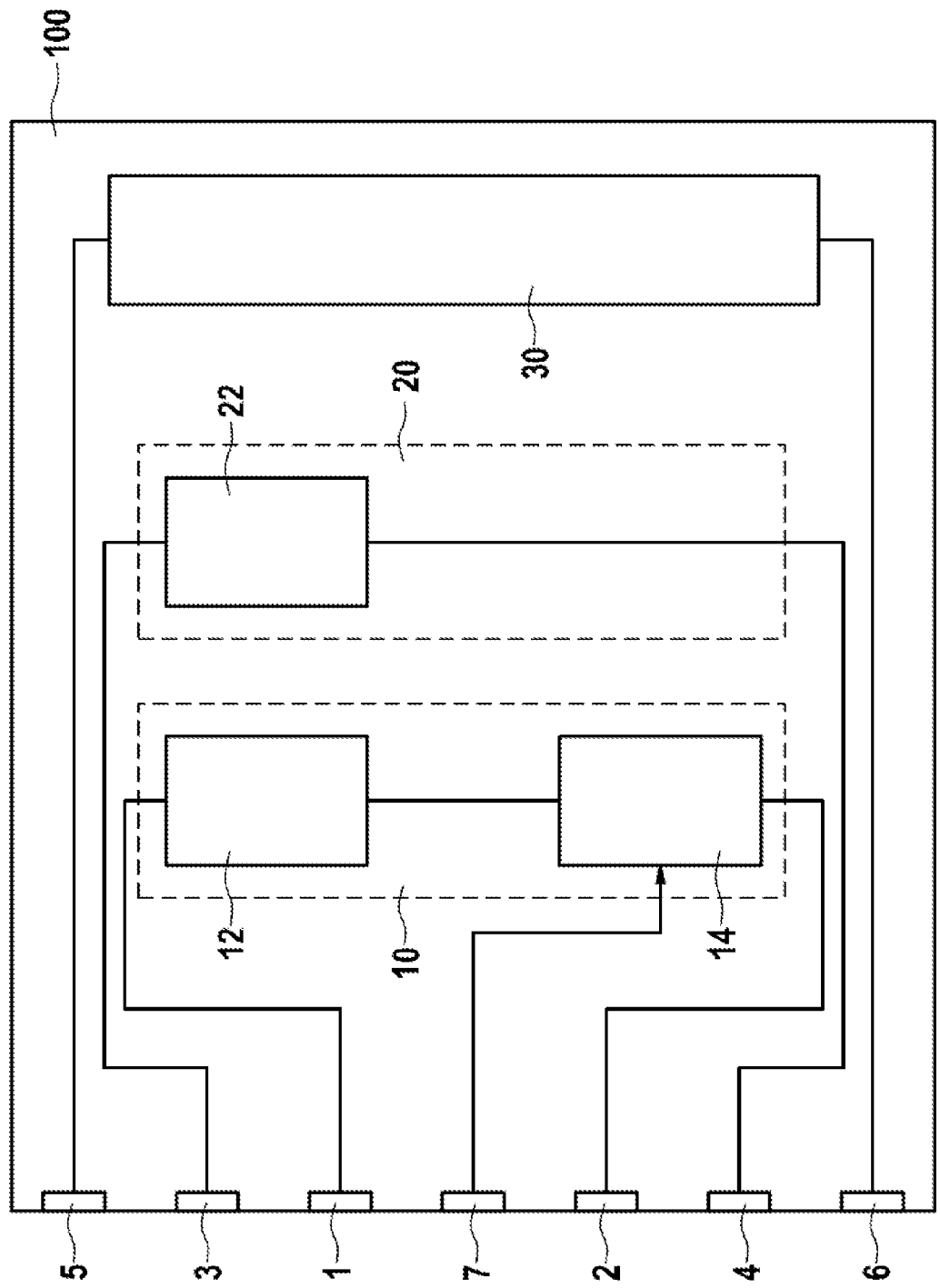
FIG. 2 shows a schematic illustration of a switching element according to the invention according to a second embodiment of the invention.

FIG. 2 shows a schematic illustration of a switching element 100 according to the invention according to a second embodiment of the invention. The switching element 100 according to the invention here comprises a first coil unit 10 and a second coil unit 20.

An important difference between the switching element 100 illustrated in FIG. 1 and the switching element 100 illustrated in FIG. 2 consists in that only the first coil unit 10 of the switching element 100 illustrated in FIG. 2 comprises a first delay circuit 14. It is, however, conceivable that only the second coil unit 20 of the switching element 100 illustrated in FIG. 2 comprises a second delay circuit 24 (cf. FIG. 1).

The switching element 100 according to the invention illustrated in FIG. 2, like the switching element 100 according to the invention illustrated in FIG. 1, also comprises a switching unit 30 and seven terminals 1 to 7. The first coil unit 10 here is electrically connected via the terminals 1 and 2 to a first driver circuit 50. The second coil unit 20 is electrically connected via the terminals 3 and 4 to a second driver circuit 60. An external electric circuit 300 is electrically connected via the terminals 5 and 6 to the switch contacts of the switching unit 30.

Control signals are supplied via the terminal 7 from a control unit 40 to the first delay circuit 14, so that the delay times of the first delay circuit 14 can be set arbitrarily as required.

Figure 3:
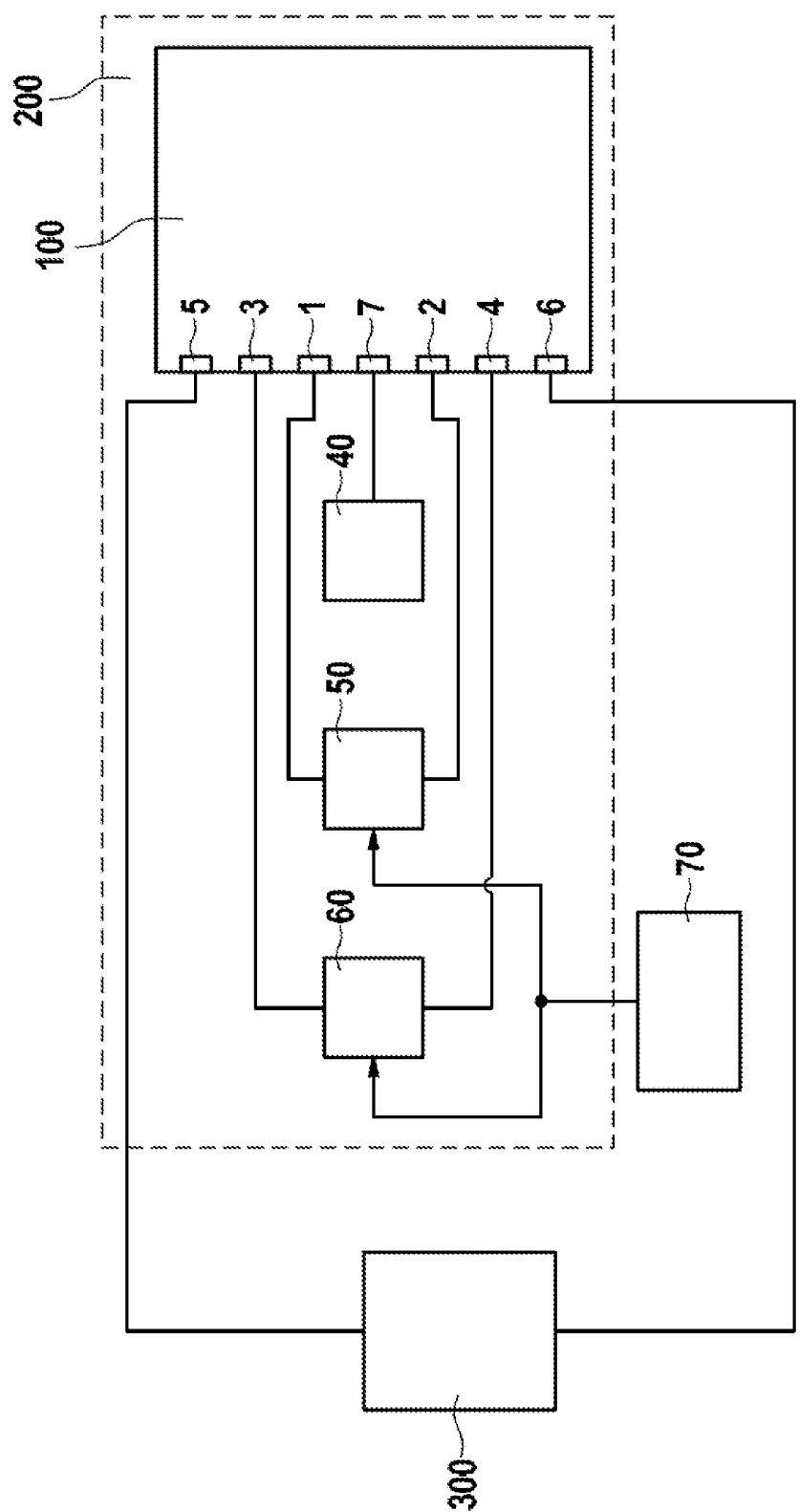
FIG. 3 shows a schematic illustration of a switching device according to the invention.

A schematic illustration of the switching device 200 according to the invention is shown in FIG. 3. The switching device 200 comprises a switching element 100 according to the invention, which is shown in FIG. 1 or 2, a first driver circuit 50 and a second driver circuit 60.

The first driver circuit 50 is electrically connected via the terminals 1 and 2 of the switching element 100 to the first coil unit 10 (cf. FIGS. 1 and 2), while the second driver circuit 60 is electrically connected via the terminals 3 and 4 of the switching element 100 to the second coil unit 20 (cf. FIGS. 1 and 2).

An external electric circuit 300 is electrically connected via the terminals 5 and 6 of the switching element 100 to the switch contacts of the switching unit 30 (cf. FIGS. 1 and 2) of the switching element 100. The external electric circuit can here be designed as an on-board network of a motor vehicle, wherein the on-board network comprises a battery system with a large number of battery cells and a battery management system. The switching device 200 according to the invention can be integrated into the battery management.

A control unit 40 is electrically connected to the terminal 7, so that control signals for control of the first and/or of the second delay circuit 14, 24 (cf. FIGS. 1 and 2) are supplied by the control unit 40 to the first and the second delay circuit 14, 24.

The first and the second coil unit 10, 20 are supplied via the first and the second driver circuit 50, 60 from an external, common energy source 70. It is conceivable that the first and the second coil unit 10, 20 are supplied via the respective driver circuits 50, 60 from two separate energy sources 70. An external energy source 70 is used in FIG. 3. It is also conceivable that the switching device 200 comprises at least one energy source 70.

The switching device 200 can comprise a control device (not illustrated) for control of both driver circuits 50, 60. It is, however, also conceivable that the two driver circuits 50, 60 are each assigned to a control device. It is also conceivable that the control of the driver circuits 50, 60 is carried out by at least one external control device.

Figure 4:
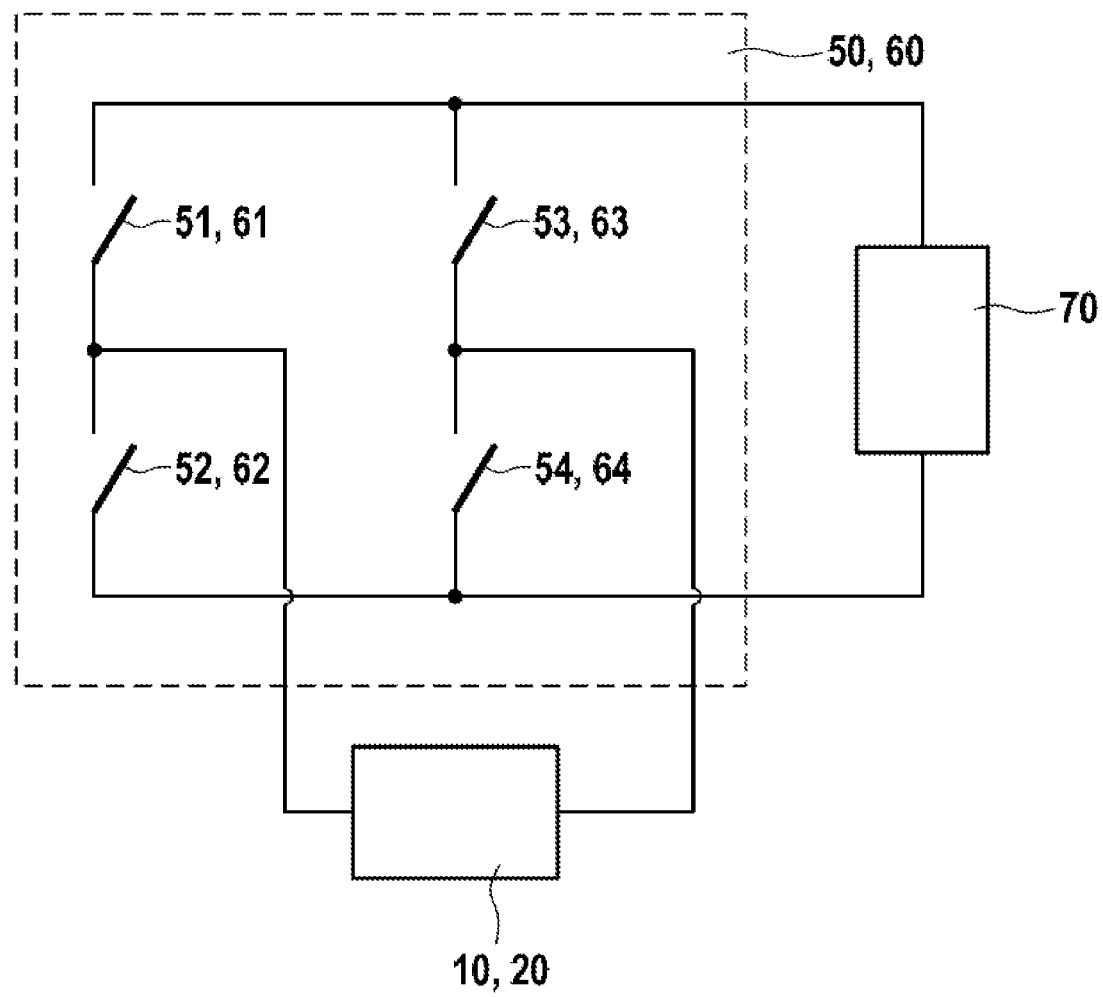
FIG. 4 shows a schematic illustration of a driver circuit.

FIG. 4 shows a schematic illustration of a driver circuit 50, 60. The driver circuit 50, 60 here is designed as an H-bridge circuit of four semiconductor switches 51 to 54, 61 to 64, such as for example MOSFETs or IGBTs. Through appropriate control of the four semiconductor switches 51 to 54, 61 to 64, when closing the switching unit 30 a current flows in a first direction in the coil 12, 22 of the coil unit 10, 20 assigned to the driver circuit 50, 60, while when opening the switching unit 30, a current flows in the coil 12, 22 in a second direction opposed to the first direction. For example, when switching on the first coil unit 10 or the second coil unit 20, a first semiconductor switch 51 and a fourth semiconductor switch 54 of the first driver circuit 50, or a first semiconductor switch 61 and a fourth semiconductor switch 64 of the second driver circuit 60 are switched on, while a second semiconductor switch 52 and a third semiconductor switch 53 of the first driver circuit 50, or a second semiconductor switch 62 and a third semiconductor switch 63 of the second driver circuit 60 remain switched off. When switching off the first coil unit 10 or the second coil unit 20, the second semiconductor switch 52 and the third semiconductor switch 53 of the first driver circuit 50, or the second semiconductor switch 62 and the third semiconductor switch 63 of the second driver circuit 60 are switched on, while the first semiconductor switch 51 and the fourth semiconductor switch 54 of the first driver circuit 50, or the first semiconductor switch 61 and the fourth semiconductor switch 64 of the second driver circuit 60 are switched off.

During operation of the switching device 200 according to the invention, the switching unit 30 of the switching element 100 according to the invention can be closed through the simultaneous switching on of the first coil unit 10 and of the second coil unit 20. If a fault state in the second coil unit 20 or in the second driver circuit 60 is detected, the closed state of the switching unit 30 is maintained by the first coil unit 10. If a fault state is detected in the first coil unit 10 or the first driver circuit 50, the closed state of the switching unit 30 is maintained by the second coil unit 20.

If a fault state is detected in the second coil unit 20 or the second driver circuit 60, the first coil unit 10 can be switched off by the first delay circuit 14 after a predefined period of time if a control signal is passed from the control unit 40 to the first delay circuit 14. The switching unit 30 remains closed if no control signal is received from the at least one control unit 40.

If a fault state is detected in the first coil unit 10 or in the first driver circuit 50, and the second coil unit 20 comprises a second delay circuit 24, the second coil unit 20 can be switched off by the second delay circuit 24 after a predetermined period of time if a control signal is supplied by the at least one control unit 40 to the second delay circuit 24. The switching unit 30 remains closed if a control signal is not received from the control unit 40, or if the second coil unit 20 does not have a delay circuit 24.

During operation of the switching device 200 according to the invention, the switching unit 30 can also be closed by switching on the second coil unit 20. If a fault state in the second coil unit 20 or in the second driver circuit 60 is detected, the first coil unit 10 is switched on.

After a predetermined period of time, the first coil unit 10 can be switched off by the first delay circuit 14.

The invention is not restricted to the exemplary embodiments described here and the aspects emphasized herein. A large number of variations that lie within the scope of professional activity, are rather possible within the scope given by the claims.

The invention claimed is:

1. A switching device (200) comprising
a switching element (100), including
    a switching unit (30),
    a first and a second coil unit (10, 20) for closing and opening the switching unit (30),
    wherein the first coil unit (10) comprises a first coil (12) and wherein the second coil unit (20) comprises a second coil (22),
    wherein the first coil unit (10) comprises a first controllable delay circuit (14) that is connected in series with the first coil (12),
    wherein the second coil unit (20) comprises a second controllable delay circuit (24) that is connected in series with the second coil (22),
    at least one control unit (40) for control of the first controllable delay circuit (14) and the second controllable delay circuit (24),
    a first driver circuit (50) for driving the first coil unit (10), and
    a second driver circuit (60) for driving the second coil unit (20).

2. The switching device (200) according to claim 1, wherein
    the at least one control unit (40) is designed to control the first controllable delay circuit (14) and the second controllable delay circuit (24) separately from one another.

3. The switching device (200) according to claim 1, wherein
    the switching device (200) comprises at least one energy source (70) that supplies the first coil unit (10) via the first driver circuit (50) and the second coil unit (20) via the second driver circuit (60).

4. A battery management system that comprises at least one switching device (200) according to claim 1.

5. A motor vehicle that comprises at least one switching device (200) according to claim 1.

6. The switching device (200) according to claim 1, wherein the switching device is configured to maintain the closed state of the switching unit (30) by the first coil unit (10) in the presence of a fault state in the second coil unit (20) or the second driver circuit (60).

7. The switching device (200) according to claim 6, wherein the switching device (200) is configured to maintain the closed state of the switching unit (30) by the second coil unit (20) in the presence of a fault state in the first coil unit (10) or the first driver circuit (50).

8. The switching device (200) according to claim 7, wherein the switching device (200) is configured to close the switching unit (30) by switching on the second coil unit (20); and switch on the first coil unit (10) when a fault state is detected in the second coil unit (20) or in the second driver circuit (60).

9. The switching device (200) according to claim 8, wherein the first coil unit (10) is switched off after a predefined period of time by the first controllable delay circuit (14).

10. The switching device (200) according to claim 1, wherein the first driver circuit (50) is configured for only driving the first coil unit (10).

11. The switching device (200) according to claim 10, wherein the second driver circuit (60) is configured only for driving the second coil unit (20).

12. A method for operation of a switching device (200), the switching device comprising
    a switching element (100) including a
        switching unit (30),
        a first and a second coil unit (10, 20) for closing and opening the switching unit (30), wherein the first coil unit (10) comprises a first coil (12), wherein the second coil unit (20) comprises a second coil (22), wherein the first coil unit (10) comprises a first controllable delay circuit (14) that is connected in series with the first coil (12), wherein the second coil unit (20) comprises a second controllable delay circuit (24) that is connected in series with the second coil (22),
    at least one control unit (40) for control of the first controllable delay circuit (14) and the second controllable delay circuit (24), a first driver circuit (50) for driving the first coil unit (10) and a second driver circuit (60) for driving the second coil unit (20), the method comprising:
    closing of the switching unit (30) through simultaneously switching on the first coil unit (10) and the second coil unit (20);
    maintaining the closed state of the switching unit (30) by the first coil unit (10) in the presence of a fault state in the second coil unit (20) or the second driver circuit (60); and
    maintaining the closed state of the switching unit (30) by the second coil unit (20) in the presence of a fault state in the first coil unit (10) or the first driver circuit (50).

13. The method of claim 12, further comprising:
    closing the switching unit (30) by switching on the second coil unit (20); and
    switching on the first coil unit (10) when a fault state is detected in the second coil unit (20) or in the second driver circuit (60).

14. The method of claim 13, wherein the first coil unit (10) is switched off after a predefined period of time by the first controllable delay circuit (14).

* * * * *